Aug. 12, 1941.  W. D. BRUE  2,252,115
FILLER FOR GREASE GUNS
Filed Sept. 26, 1940
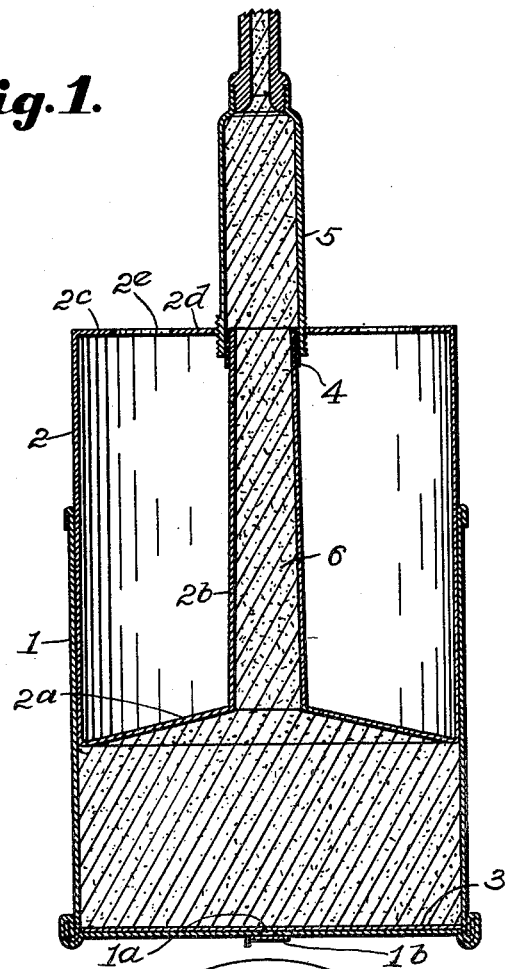
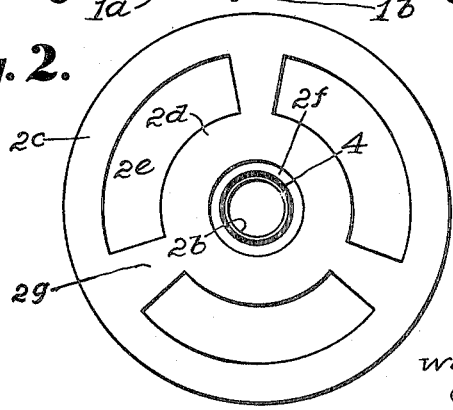
Inventor
Walter D. Brue, by
G. C. Kennedy,
Attorney Patented Aug. 12, 1941

2,252,115

UNITED STATES PATENT OFFICE 2,252,115

FILLER FOR GREASE GUNS

Walter D. Brue, Center Township, Winnebago County, Iowa

Application September 26, 1940, Serial No. 358,448

2 Claims. (Cl. 221—47.5)

My invention relates to improvements in grease gun fillers, and the particular object of my invention is to provide novel means for filling a grease gun or other similar devices without leakage in the process and by simple constructions of the associated elements thereof.

Another object is to supply a basal removable inner closure in the grease container to seal an exit aperture in the bottom of the container, with other means for removably sealing outwardly said aperture.

Another object is to furnish a novel type of plunger or piston adapted to slidably fit the inner wall of the container and including an apertured top wall to seal an open end of a grease gun therethrough and to maintain the delivery spout of the plunger in a central position in the container.

I have attained the above objects by the means which are hereinafter described and claimed, and illustrated in the accompanying drawing.

Fig. 1 is a vertical axial section of my invention, showing the use thereof in filling a grease gun or the like. Fig. 2 is a top plan of the plunger only.

The numeral 1 denotes an open top receptacle such as is used for containing grease or the like in semi-solid condition, which may include a discoidal imperforate member 3 as a removable inner bottom closure in the receptacle to normally close an aperture 1a centrally positioned in the can bottom, with a sealing member 1b removably closing said aperture in the base of the receptacle or can. This combination, however, may be omitted if desired, when the receptacle or can has an imperforate bottom. The combination, when furnished, closes the lower part of the receptacle, except when the members 3 and 1b are removed, and it is desired to clean the interior walls of the can and discharge a liquid cleaning composition through the aperture 1a.

The numeral 2a denotes the upwardly directed flatly conical plunger which has a vertically directed cylindrical outer wall or sleeve 2 adapted to slidably fit the inner wall of the container 1.

The plunger base 2a has a fixed upwardly directed central spout 2b which may be slightly contracted to its upper end, and a compressible sleeve 4 of leather or the like is seated removably upon the upper end thereof.

The outer wall 2 of the plunger is partially closed at the top by a cover part 2c. This cover is centrally apertured at 2f, as shown in Fig. 2. The cover also has arcuate apertures 2e concentric with the aperture 2f and radial parts 2g connect the cover parts 2c and 2d.

The numeral 5 denotes an open end grease gun, inverted, with its lower end introduced vertically downwardly through the central aperture 2f to fit about the compressible sleeve 4 on the spout 2b, to sealingly close their connection. Since the spout 2b is slightly coned, the sleeve 4 seals the connection, under compression.

It will be seen, that when, as shown in Fig. 1, the plunger 2a is forced downwardly, the contents 6 of the container 1 are discharged through the spout 2b into and fills the grease gun 5, which may then be removed upwardly, and a closure capped on an exterior screw thread of the gun. The cover part 2d maintains the spout 2b traversing its central aperture 2f rigidly when the device is in use.

I claim:

1. In combination, an open top receptacle for grease or the like, having a central bottom aperture, a discoidal imperforate member superposed upon said bottom part, a sealing member rockably pivoted to one side of the under face of the receptacle to close the aperture therein, a hollow sleeve mounted for vertical reciprocation and to fit the inner wall of the receptacle, the sleeve having an upwardly coned basal part with an upwardly directed central and slightly upwardly coned spout, and also having a centrally apertured top plate whose aperture is spaced from and around the upper end of the spout to receive therethrough an open end part of a grease gun, and an elastically compressible slightly coned device removably fitted upon the upper end of the spout to removably enter and fit the lower open end part of the grease gun.

2. In combination, an open top receptacle for grease or the like, a sleeve mounted for vertical reciprocation and to fit the inner wall of the receptacle, the sleeve having an upwardly coned basal part with an upwardly directed central and upwardly directed slightly conical spout, the sleeve also having a top cover with a central opening, an elastically compressible slightly coned device fitted closely and removably upon the upper end part of the spout, and spaced from the inner edge wall of said central opening, whereby an open receiving end of a grease gun or the like may traverse said central opening and compressibly inclose said coned device, removably.

WALTER D. BRUE.